United States Patent

[11] 3,592,370

| [72] | Inventor | Peter Boardman |
| | | Newton-le-Willows, England |
| [21] | Appl. No. | 874,433 |
| [22] | Filed | Nov. 6, 1969 |
| [45] | Patented | July 13, 1971 |
| [73] | Assignee | Pilkington Brothers Limited |
| | | Liverpool, England |
| [32] | Priority | Nov. 14, 1968 |
| [33] | | Great Britain |
| [31] | | 54,140/68 |

[54] CUTTING OF GLASS SHEETS
19 Claims, 11 Drawing Figs.

[52] U.S. Cl. .................................................. 225/2,
225/96.5, 225/97, 225/103
[51] Int. Cl. ....................................................... B26f 3/00
[50] Field of Search .......................................... 225/2, 3, 5,
96.5, 96, 97, 99, 103, 104

[56] References Cited
UNITED STATES PATENTS

| 1,895,779 | 1/1933 | Aurien et al. | 225/2 |
| 1,972,210 | 9/1934 | Waldron | 225/96.5 |
| 2,705,390 | 4/1955 | Denlow | 225/2 |
| 3,388,843 | 6/1968 | Umbel | 225/96 |

*Primary Examiner*—Frank T. Yost
*Attorney*—Sughrue, Rothwell, Mion, Zinn & Macpeak ABSTRACT: A glass sheet is divided along a required line of break delineated by a score line on the sheet by supporting the sheet on an elongated member disposed in the region of the required line of break and making line contact with the underface of the sheet. One end of the member is then raised and a bending moment is applied across the raised end of the score line so as to effect a break which runs along the supported line.

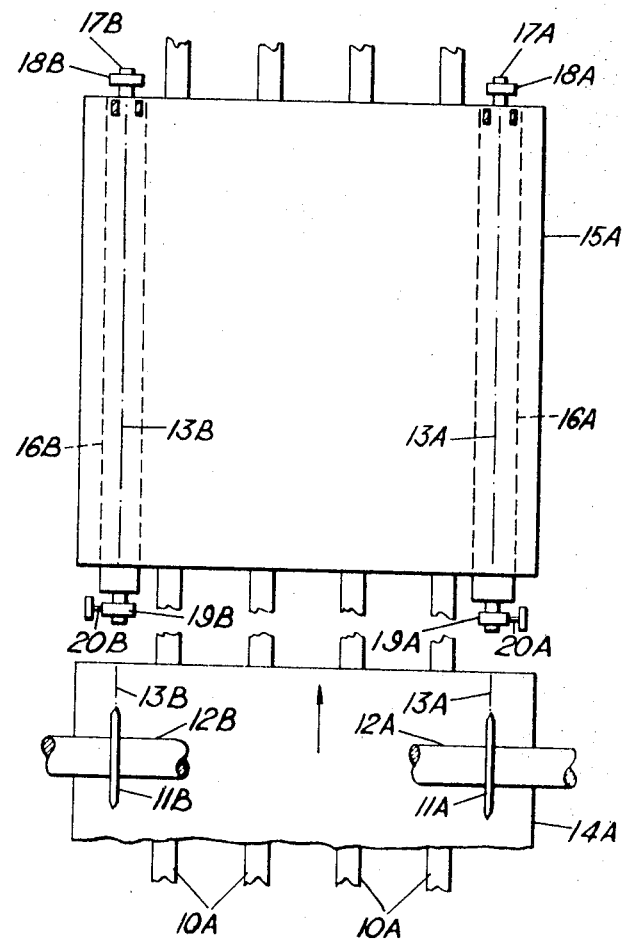

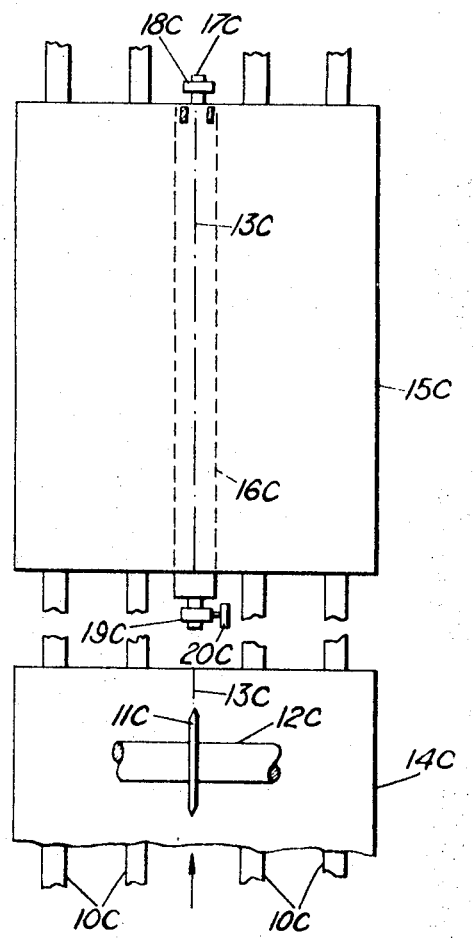

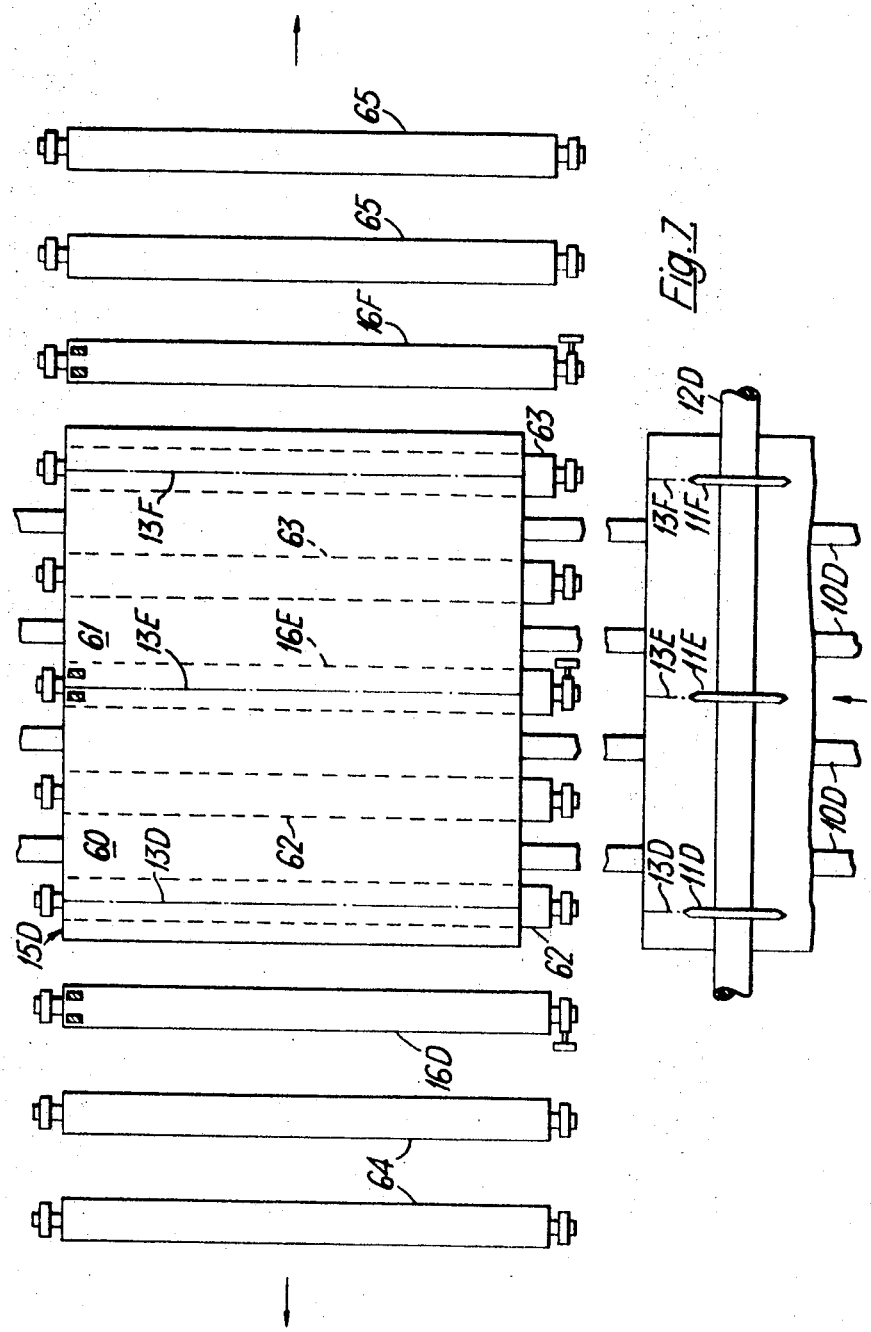

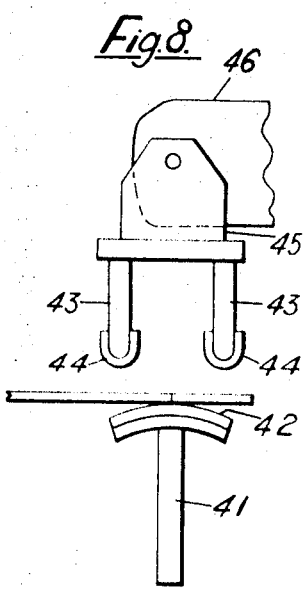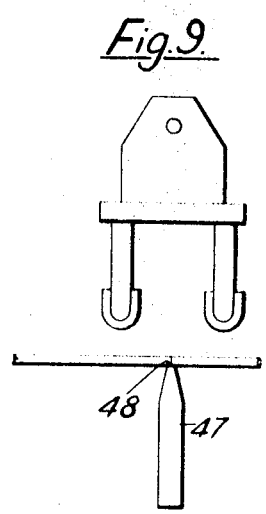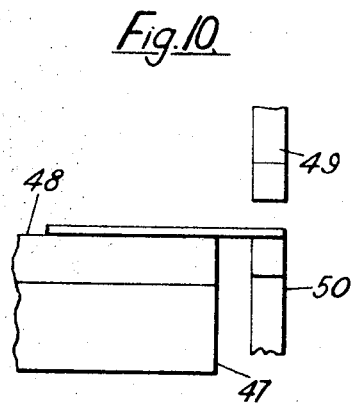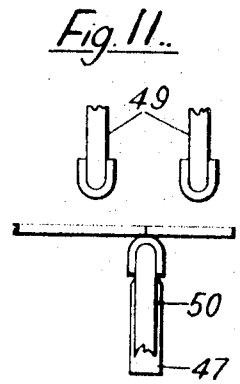

3,592,370

CUTTING OF GLASS SHEETS

BACKGROUND OF THE INVENTION

1. Field of the Invention

This invention relates to the cutting of glass sheets, and is especially applicable to separating edge portions from glass sheets.

2. Description of the Prior Art

In the manufacture of sheets of glass it is, at various stages, required to divide a glass sheet into separate portions. Also it is usual to cut narrow marginal strips from flat glass made by the float process or by a vertical drawing process. Such cutting of flat glass is usually accomplished by scoring the sheet along the required line of break, and then applying a bending moment across the length of the score line, thereby to effect a break along the score line.

It has been found that a clean break along the score line is not always achieved. Sometimes flat glass has slightly waved edge portions, and difficulties can be encountered in effecting a clean break to remove marginal portions, particularly if the glass is relatively thin, e.g. about 3 mm. thick. Due to the form of the edge portions, the bending moment applied may vary along the score line, which can result in fractures beginning at a number of separate breaking points instead of a single clean break along the entire length of the score line.

It is a main object of the present invention to ensure that a clean break runs along a score line on a glass sheet from one end of the score line.

SUMMARY

The invention provides apparatus for dividing a glass sheet along a required line of break delineated by a score line on the sheet comprising a snapping station where the sheet is supported by an elongated member, e.g. a rotatable roller, which makes line contact with the underface of the sheet in the region of the required line of break.

Actuating means are provided to raise one end of the elongated member above the other end while said line contact between the member and the sheet is maintained, and pressure means are provided to apply a bending moment across the raised end of the score line so as to effect a break which runs along the supported line.

Scoring of the sheet may be effected at any time before the application of the pressure means.

BRIEF DESCRIPTION OF THE DRAWINGS

FIG. 5 is a schematic plan view of the apparatus for separating opposed side or edge portions from rectangular glass sheets, FIG. 6 is a schematic plan view of apparatus for dividing a glass sheet along a central line, FIG. 7 is a schematic plan view of apparatus for dividing a glass sheet along a central line into two sheets and for separating marginal portions from the two sheets, FIGS. 8 and 9 are end view of alternative parts for use in apparatus of the form shown in the preceding figures, FIG. 10 is a side elevation of alternative mechanism for use in apparatus of the form shown in the preceding figures and FIG. 11 is an end view of the mechanism shown in FIG. 10.

DESCRIPTION OF THE PREFERRED EMBODIMENTS

Figure 1:
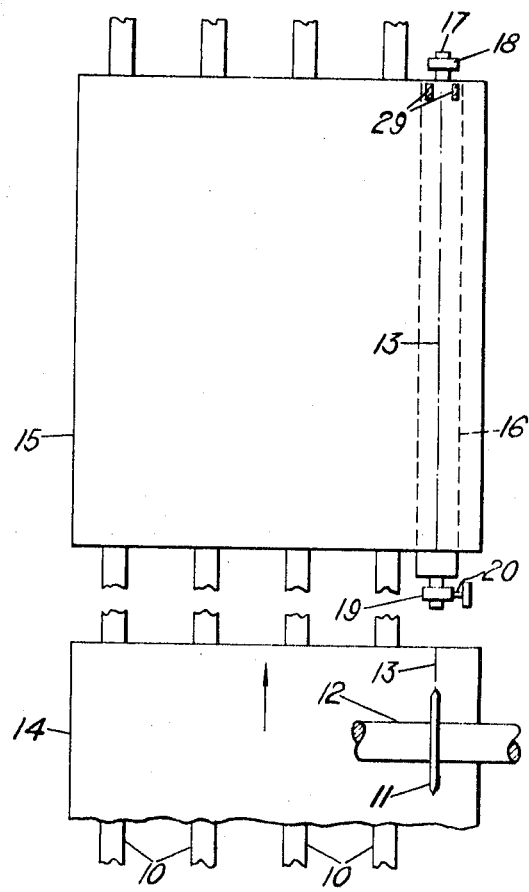
FIG. 1 is a schematic plan view of apparatus, by way of example, for separating one relatively narrow marginal portion from a rectangular glass sheet.

Referring to FIG. 1, a conveyor system, shown schematically as a series of parallel endless conveyor belts 10 with an upper substantially horizontal run, is arranged to feed rectangular glass sheets beneath a scoring device. The scoring device is schematically shown as a rotatable scoring disc 11 mounted on a shaft 12, and is positioned to engage and mark a score line 13 along the upper surface of each sheet. The score line is marked along the required line of break for separating a narrow rectangular marginal portion from the sheet, and in FIG. 1 one sheet 14 is shown passing beneath the scoring device.

After leaving the scoring device each sheet is fed forwardly by the belts 10 to a snapping station, shown occupied by a sheet 15, at which the score line 13 lies over a cylindrical roller 16, and the leading edge of the sheet is over the far end of the roller (as considered in the direction of travel of the sheet). The feed by the belts 10 is intermittent so that each sheet is arrested at the snapping position shown.

Figure 2:
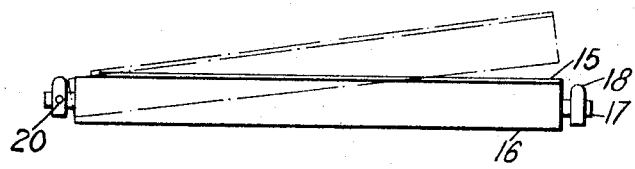
FIG. 2 is a schematic side elevation of part of the apparatus shown in FIG. 1.

The roller 16 has a periphery of rubber and is mounted on a shaft 17 whose far end is housed in a bracket 18, and whose near end is housed in a bracket 19. The bracket 18 can be raised and lowered by an actuating mechanism described later, and the bracket 19 is mounted on a fixed pivot 20. The roller 16 can therefore be moved in a vertical plane about one end thereof between a horizontal position, shown in full line in FIG. 2, and a position inclined to the horizontal, shown in broken line in FIG. 2, by movement about the pivot 20.

Figure 3:
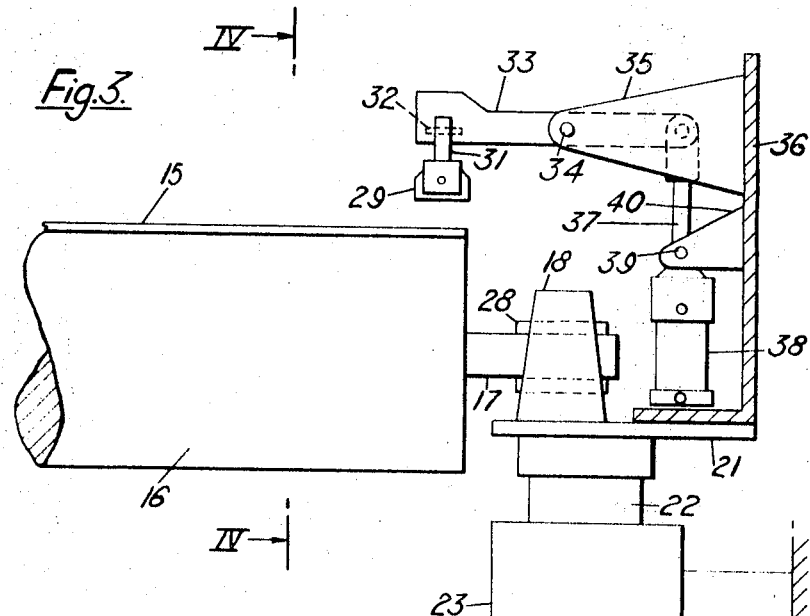
FIG. 3 is a diagrammatic side elevation of mechanism used in the apparatus shown in FIGS. 1 and 2.

The actuating mechanism for raising and lowering the bracket 18 is diagrammatically shown in FIG. 3. The bracket 18 is mounted on a platform 21 which is supported on a cylindrical slide member 22. The member 22 can slide axially (i.e. vertically) in a fixed housing 23. A double-acting hydraulic jack 24 has its actuator ram 25 secured to the slide member 22, so that operation of the jack effects upward and downward movement of the slide member. The jack is pivoted by means of a lug 26 to a fixed bracket 27. As shown in FIG. 3, the end of the shaft 17 housed in the bracket 18 is provided with a cylindrical flexible sleeve 28 which permits slight relative movement between the shaft and the bracket as the latter is raised by operation of the jack 24.

FIG. 3 also shows bearing or snapping pressure mechanism which can be operated to break or snap a glass sheet along its score line. This mechanism comprises a pair of finger elements 29 (see also FIG. 4) carried on pivot pins 30 at the ends pin the limbs of a bifurcated member 31. The member 31 is carried on a pivot pin 32 in a hook forming one end of an arm 33. The pivot pins 30 have a common axis normal to the plane of FIG. 3 and parallel to the plane of FIG. 4, whereas the pivot pin 32 has its axis parallel to the plane of FIG. 3 and normal to the plane of FIG. 4. The finger elements 29 are thus independently movable about the axis of the pins 30, and the bifurcated member 31 is movable about the axis of the pin 32, which is in a plane normal to the axis of the pins 30. The arm 33 is mounted on a pivot 34 on a bracket 35 secured to a support 36 carried on the platform 21.

The other end of the arm 33 is pivotally connected to an actuator ram 37 of a pneumatic jack 38 mounted by a pivot 39 on a bracket 40 secured to the support 36. Thus, by operation of the jack, 38, the arm 33 can be moved about its pivot 34 to lower and raise the finger elements 29.

The manner of operation of the apparatus described above is as follows:

When a glass sheet is at rest in the horizontal position shown occupied by the sheet 15 in FIG. 1, the roller 16 is also initially at its horizontal position. The hydraulic jack 24 is then operated to raise the platform 21, and hence the bracket 18, thereby lifting the end of the roller 16 and inclining the roller to the horizontal. The side portion of the sheet 15, which is supported along the periphery of the roller 16, becomes inclined with the roller, i.e. the top right-hand corner of the sheet, as viewed in FIG. 1, is raised above the level of the other three corners. The score line 13 along the sheet 15 therefore becomes inclined to the horizontal, and the sheet flexes so that the other side edge remains substantially horizontal.

Figure 4:
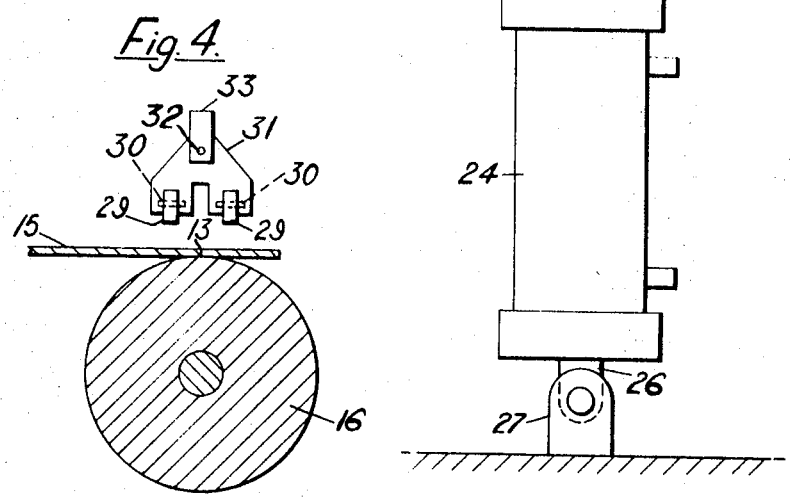
FIG. 4 is a sectional view on the line IV-IV of FIG. 3 of part of the mechanism shown in FIG. 3.

In FIGS. 1 and 4 the score line 13 is shown directly above the top dead centerline of the roller 16; in other words the line contact between the roller and the sheet is coincident with the required line of break marked by the score line. As explained later, such coincidence is not essential, but, for ease of explanation, the operation will for the present be described as applied to the case where there is coincidence.

As the end of the roller 16 is raised, the pressure mechanism mounted on the platform 21 is raised with it. When the desired inclination of the roller 16, and hence of the score line 13, has been achieved, the pneumatic jack 38 is operated to raise its actuator rod 37 and thereby thrust the finger elements 29 downwardly. As can be seen from FIGS. 1 and 4 the finger elements 29 engage the glass sheet on opposite sides and at the raised end of the score line 13. They therefore apply pressure on opposite sides of the score line at this position, against the reaction provided by the roller 16, whereby subjecting the glass to opposed bending moments about the score line. In this manner a break, which runs along the score line from its raised end to its lower end, is effected, and the marginal portion becomes separated from the sheet, a suitable receptacle into which it can fall being provided.

The pivoted mounting for the finger elements 29, enables the finger elements to adjust their positions as they contact the glass and to apply substantially even pressures thereto.

After separation of the marginal portion, the finger elements 29 are raised, by reverse operation of the pneumatic jack 38, and the end of the roller 16 is lowered, so that the roller reassumes its horizontal position, by reverse operation of the hydraulic jack 24 to lower the platform 21. The trimmed sheet 15 is then fed away from the separating position. The trimmed sheet 15 may be fed sideways, i.e. transversely to its previous path of travel, by means of wheels or rollers arranged between, and to rotate about axes parallel to, the belts 10, in well-known manner. The roller 16, being cylindrical and readily rotatable, would assist in such subsequent feeding of the remaining sheet portion.

A further glass sheet is then fed to the snapping station and the cycle of operation repeated.

Guide or stop members, not shown in the drawings, may be provided to prevent slowing, other undesired movement, of a sheet as its side portion is inclined by the roller 16. Cleaning devices, such as air jets or brushes, may also be provided to clean the periphery of the roller 16 of glass particles that may adhere thereto.

The diameter, and degree of inclination of the roller 16 (which is greatly exaggerated in FIG. 2) are selected to give optimum results with the particular glass sheets being handled. In the particular embodiment shown and described the roller has a diameter of about 23 cm. and a length of about 5.5 m. and its end is raised a distance of from 10 to 15 cm.

It is not essential that the score line along the glass sheet should be directly above the line of contact between the roller and the sheet, and it has been found that in some cases results can be improved by avoiding such coincidence as long as the line of contact remains in the region of the score line. For example, it has been found when separating marginal portions of about 5 to 15 cm. width from glass sheets of 75 cm. to 175 cm. width and having a thickness of 6 mm. that improved results can be obtained if the line of break (marked by the score line) is positioned 6 to 12 mm. from the top dead center line of the roller 16, toward the side occupied by the major portion of the sheet, i.e. with the score line to the left of the line of contact between the sheet and the roller as viewed in FIG. 1. Conversely, it has been found with sheets and marginal portions of the same dimensions but of 3 mm. thickness, that improved results can be obtained if the line of break is positioned 6 to 12 mm. from the top dead center line of the roller 16 towards the side occupied by the marginal portion of the sheet, i.e, with the score line to the right of the line of contact between the sheet and the roller as viewed in FIG. 1.

The above described embodiment removes one marginal portion from each sheet of glass. If it is desired to remove marginal portions from both sides of a rectangular sheet, the apparatus is duplicated in a manner schematically shown in FIG. 5.

With this embodiment the glass sheets are fed by a horizontal conveyor system, schematically shown as belts 10A, beneath a pair of scoring devices, schematically shown as rotatable scoring discs 11A and 11B mounted on shafts 12A and 12B (which may, in practice, be a single common shaft). The scoring devices are positioned to mark respective score lines 13A and 13B on the sheet along the required lines of break for separation of the side or edge portions.

After being scored, the sheet is fed to a position, shown occupied by a sheet 15A, at which the score lines 13A and 13B respectively overlie parallel cylindrical rollers 16A and 16B. In the same manner as described above in relation to the roller 16 of FIG. 1, each of the rollers 16A and 16B is moved between a horizontal position and a position inclined to the horizontal by vertical pivotal movement about its near end, as considered in the direction of travel of the sheets. In FIG. 5 the parts mounting the rollers 16A and 16B are indicated by the same reference numerals as the corresponding parts in FIG. 1, but with the added suffixes A and B respectively.

Lifting and pressure mechanism, as described above with reference to FIGS. 3 and 4, is associated with the far end of each of the rollers 16A and 16B. Alternatively, there may be a common lifting mechanism arranged to raise and lower a cross beam or platform on which the end support brackets for both the rollers 16A and 16B are mounted.

In operation, the rollers 16A and 16B are simultaneously pivoted from their horizontal positions to their inclined positions by raising their far ends. The two far end corners of the glass sheet are therefore raised, and the score lines 13A and 13B, which are directly above (or as previously explained, which may be slightly displaced from) the lines of contact between the rollers and the sheet, are correspondingly to the horizontal. The pressure fingers then bear down on the sheet to effect breaks which run from the raised end of each score line to its lower end.

FIG. 6 schematically shows an arrangement whereby apparatus in accordance with the invention can be used to separate a large rectangular glass sheet along a central line of break to produce two smaller rectangular glass sheets. The apparatus is essentially the same as that previously described but its disposition relative to the sheets is altered. In FIG. 6 the parts are indicated by the same reference numerals as in FIG. 1, but with the added suffix C.

The scoring device is positioned to mark the score line 13C centrally of the sheet along the required line of break, and, after being scored, the sheet is received with the central score line over the roller 16C. The far end of the roller 16C is raised to incline the roller to the horizontal, thereby inclining the central portion of the sheet which rests on the roller. The pressure mechanism then operates to effect a break which runs from the raised end of the score line to its lower end.

FIG. 7 schematically shows an arrangement where apparatus in accordance with the invention can be used to separate a large rectangular glass sheet along a central line of break to produce two smaller rectangular sheets and then to remove the marginal portion of each of the smaller sheets which is remote from the central line of break. In FIG. 7 the parts are indicated by the same reference numerals as in FIG. 1, but with the added suffixes D, E and F.

With this embodiment, the glass sheets are fed by a horizontal conveyor system, schematically shown as belts 10D, beneath three scoring discs 11D, 11E and 11F which are all mounted on a common shaft 12D. The scoring devices are positioned to mark respective scoring lines 13D, 13E and 13F on the sheet along the required lines of break. After being scored, the sheet is fed on the moving belts 10D to the snapping station, shown occupied by a sheet 15D, at which the middle score line 13E overlies a cylindrical roller 16E. In the same manner as described above, the far end of the roller 16E is raised to incline the roller to the horizontal, thereby inclining the central portion of the glass sheet. The pressure mechanism associated with the roller 16E is then operated to effect a break which runs from the raised end of the score line 13E to its lower end. The sheet 15D is thus divided into two smaller sheets 60 and 61, and the far end of the roller 16E is then lowered to return the roller to its horizontal position.

These smaller sheets 60 and 61 are then fed respectively in opposite directions normal to the original direction of travel of the sheet 15D by means of rotatable horizontal rollers 62 and 63. Thus the rollers 62 are driven in one direction to feed the sheet 60 to the left, as viewed in FIG. 7, until the score line 13D overlies a cylindrical roller 16D, and the rollers 63 are driven in the opposite direction to feed the sheet 61 to the right, as viewed in FIG. 7, until the score line 13F overlies a cylindrical roller 16F. In the same manner as previously described, the far ends of the rollers 16D and 16F are then raised to incline the rollers to the horizontal, thereby inclining the respective edge portions of the sheets 60 and 61. The pressure mechanisms associated with the rollers 16D and 16F are then operated to effect respective breaks which run from the raised end of each of the score lines 13D and 13F to its lower end. The edge portions thus become separated from the sheets and fall into a suitable receptacle for cullet. The far ends of the rollers 16D and 16F are then lowered to return the rollers to the horizontal position.

The above described operation thus first separates the sheet 15D into two smaller sheets 60, 61 and then trims the edges of the sheets 60, 61. The trimmed sheets are then fed in opposite directions away from the snapping station by driving the rollers 62 and 63 and further rollers 64 and 65, the inclinable rollers 16D and 16F being rotatably mounted to assist in such feeding.

The belts 10D pass between the parallel to the rollers 16E, 62 and 63. In a manner known per se, the rollers 16E, 62 and 63 are mounted on a frame (not shown) which can be raised and lowered to alter the level of the rollers relative to the level of the belts. As a sheet is being fed by the belts 10D to the snapping station the rollers 16E, 62 and 63 are at a level slightly below that of the belts so that the sheet can be fed over the rollers without interference therefrom. The rollers are then raised to a level slightly above the belts 10D, thereby lifting the sheet (sheet 15D) from the belts, so that subsequently the smaller sheets 60 and 61 can be fed by the rollers sideways over the belts without interference from the belts. After the trimmed sheets have left the snapping station the rollers are lowered to a level below the belts so that a further sheet can be received at the snapping station.

In all the arrangements described above the inclinable roller or rollers, when inclined to the horizontal, support a substantial proportion of the weight of the glass sheet or sheets, and a certain amount of flexing to the glass occurs. Thus, for example, in the arrangement shown in FIG. 6 the side edges of the sheet remain substantially horizontal and the sheet flexes to a central hump (of gradually decreasing height along the sheet) where it is actually supported by the inclined roller 16C. In the arrangement shown in FIG. 5, where both margins of the sheet are inclined to the horizontal by the rollers 16A and 16B, the sheet tends to flex or bow under its own weight to form a central depression.

The elongated member which inclines the region of the sheet containing the required line of break, instead of being a cylindrical roller as described by way of example above, may comprise an elongated beam 41 having a part-cylindrical surface 42 and of T cross section as shown in FIG. 8. The glass sheet is received over the beam with the score line directly above, or as previously explained slightly displaced from, the line of contact between the sheet and the part-cylindrical surface 42 of the beam. The beam is then inclined to the horizontal by raising one end and pivotal movement about the other end, and the snapping or breaking mechanism then operates essentially as previously described.

FIG. 8 shows a slightly modified form of snapping device which comprises a pair of finger elements 43 whose ends have a bonded rubber edging 44, and which are secured to a support 45 pivotally mounted on an arm 46 (corresponding to the arm 33 of FIGS. 3 and 4).

The inclining member may, as a yet further example, comprise an elongated beam 47 having a simple narrow straight-edge 48, as shown in FIG. 9. The score line on the sheet locates over (or slightly displaced from) the straight-edge 48, and the operation is essentially the same as described previously. When the inclining member has a cylindrical or part-cylindrical surface, the glass can be sandwiched between the finger elements and the cylindrical surface on either side of the break, providing a more stable arrangement.

In the embodiments described above, the break is effected by moving the finger elements downwardly relatively to the inclining member. If preferred, the finger elements may be on a fixed mounting and positioned so that, as the end of the inclining member is raised, the latter presses the glass against the finger elements, thereby effecting the break.

Also, in the embodiments previously described the reaction to the pressure applied by the finger elements is provided by the inclining member. There may be provided a third finger element arranged to engage the glass from beneath, as schematically shown in FIGS. 10 and 11. Two upper finger elements 49 and one lower finger element 50 are positioned a short distance beyond the end of the beam 47, as shown in FIG. 10.

The glass sheet is received over the beam 47 so that the leading end of the sheet projects beyond the end of the beam and between the upper and lower finger elements. The score line on the sheet is, as previously, positioned directly over, or slightly displaced from, the straight-edge 48. The end of the beam is then raised, the finger elements 49 and 50 rising with it, to incline the score line to the horizontal.

The finger elements then act to effect a break along the score line. This may be achieved by having the lower finger element 50 mounted in fixed relationship to the beam, with the tip of the finger element substantially in alignment with the straight-edge 48, and by moving the upper finger elements downwardly relative to the beam to apply opposed bending moments about the score line against the reaction of the lower finger element. Alternatively, the upper finger elements 49 may be mounted in fixed relationship to the beam with their tips spaced from the line of the straight-edge 48 a distance slightly greater than the thickness of the glass sheet so that the sheet can be positioned over the beam and beneath the upper finger elements; the lower finger element 50 then presses upwardly relative to the beam, thereby pressing the glass sheets against the upper finger elements 49 and effecting the required break.

In the embodiments described above the glass sheets are scored during their travel towards and prior to arrival at the snapping station. If preferred, the glass may be scored at the snapping station by a scoring device arranged to traverse along a path parallel to and above the inclinable member. Further, the glass may be scored along the required line of break after the elongated member has inclined the region where the sheet is to be snapped, the scoring device then being arranged to traverse along a path appropriately inclined to the horizontal.

We claim:

1. Apparatus for dividing a glass sheet along a required line of break delineated by a score line on the sheet, comprising a snapping station where the sheet is supported by an elongated member which makes line contact with the underface of the sheet in the region of the required line of break, actuating means operable to raise one end of said member so that one end of said region of the sheet is raised above the other end while said line contact is maintained, and pressure means associated with said actuating means to apply a bending moment across the raised end of the score line so as to effect a break which runs along the supported line.

2. Apparatus for dividing a glass sheet along a required line of break delineated by a score line on the sheet, comprising a snapping station where the sheet is supported horizontally by support means including an elongated member having a longitudinal support surface, feeding means for feeding a sheet to the snapping station with the score line positioned above said elongated member which thereby makes line contact with the underface of the sheet in the region of the score line, actuating means operable to raise one end of said member so that one end of the score line is raised while said line contact is maintained, and pressure means associated with said actuating means to apply a bending moment across the raised end of the score line so as to effect a break which runs along the supported line.

3. Apparatus according to claim 1, wherein said elongated member has a uniformly curved cross section along its length.

4. Apparatus according to claim 3, wherein said elongated member comprises a rotatable roller.

5. Apparatus according to claim 1, wherein the pressure means include a pair of finger elements mounted on thrust means operable to thrust the finger elements down onto the surface of the glass on either side of the raised end of the score line.

6. Apparatus according to claim 5, wherein the finger elements are pivotally mounted at the ends of the limbs of a bifurcated support which is pivotally mounted on said thrust means, the axis of the pivots of the finger elements being at right angles to the axis of the pivot of the bifurcated support, so that the finger elements can adjust their positions on the sheet as they are thrust on to the sheet and thereby apply equal pressures to the sheet on either side of the end of the score line.

7. Apparatus according to claim 1, including scoring means for scoring said score line on the sheet.

8. Apparatus according to claim 7, wherein the scoring means are positioned at a scoring station displaced from the snapping station, the feeding means being capable of feeding the sheet from the scoring station to the snapping station.

9. Apparatus according to claim 1, wherein the apparatus is capable of dividing a glass sheet along at least two lines of break, each line of break being delineated by a score line on the sheet, said apparatus comprising for each said score line, an elongated member which makes line contact with the underface of the sheet in the region of the score line, actuating means operable to raise one end of each said member, and pressure means associated with said actuating means to apply a bending moment across the raised end of each score line so as to effect a break which runs along the supported line.

10. Apparatus according to claim 9, for dividing a glass sheet into two smaller sheets and for trimming a marginal edge portion from each of said smaller sheets, comprising means to divide the sheet along a first score line to produce said two smaller sheets, means to feed said two smaller sheets in opposite directions normal to said first score line to position a score line on one sheet over one said elongated member and to position a score line on the other sheet over another said elongated member, and actuating and pressure means associated with each of said elongated members to raise one end thereof and to apply a bending movement across the raised end of the score line thereon, thereby to effect breaks which separate a marginal edge portion from each of said smaller sheets.

11. Apparatus according to claim 10, wherein said means to divide the sheet along said first score line comprise a further said elongated member with associated actuating and pressure means.

12. Apparatus according to claim 10, including feed means to feed the sheet before it is divided in a direction parallel to said first score line to the snapping station at which the sheet is divided along said first score line.

13. A method of dividing a glass sheet along a required line of break delineated by a score line on the sheet, comprising the steps of supporting the sheet while making line contact with the underface of the sheet in the region of the score line, raising one end of said region of the sheet above the other end while said line contact is maintained, and applying a bending moment across the raised end of the score line to cause a clean break to run along the line of break to its lower end.

14. A method according to claim 13, including the step of scoring a surface of the sheet along the required line of break.

15. A method according to claim 14, wherein the sheet is scored before one end of said region of the sheet is raised above the other end.

16. A method of dividing a glass sheet comprising scoring a surface of the sheet along a required line of break, supporting the sheet horizontally while making line contact with the underface of the sheet along the region of substantially the whole length of the score line, raising one end of the scored region of the sheet while maintaining the line contact with that region, and applying a bending moment across the score line at that raised end to cause a clean break to run along the score line to its lower end.

17. A method according to claim 13 for dividing a glass sheet along at least two lines of break, each line of break being delineated by a score line on the sheet, comprising the steps of supporting the sheet while making line contact with the underface of the sheet in each of the regions of said score lines, raising one end of each said region of the sheet above the other end while said line contact is maintained, and applying a bending moment across the raised end of each score line to cause a clean break to run along the score line to its lower end.

18. A method according to claim 17, for dividing a glass sheet into two smaller sheets and for trimming a marginal edge portion from each of said smaller sheets, comprising the steps of dividing the sheet along a first score line to produce said two smaller sheets, moving apart said two smaller sheets in opposite directions normal to said first score line, supporting each of the moved-apart sheets while making line contact with the undersurface of the sheet in the region of a score line, raising one end of said region of each sheet above the other end while maintaining said line contact, and applying a bending movement across the raised end of the score line on each sheet thereby to effect breaks which separate a marginal edge portion from each of said smaller sheets.

19. A method according to claim 18, wherein the step of dividing the sheet along said first score line comprises making line contact with the undersurface of the sheet in the region of said first score line, raising one end of said region while maintaining said line contact, and applying a bending movement across the raised end of said first score line.